(12) United States Patent
Izumi et al.

(10) Patent No.: US 6,533,999 B1
(45) Date of Patent: Mar. 18, 2003

(54) METHOD AND APPARATUS FOR PROCESSING POLLUTED GAS CONTAINING HARMFUL SUBSTANCES

(75) Inventors: Jun Izumi, Nagasaki-ken (JP); Akinori Yasutake, Nagasaki-ken (JP); Nariyuki Tomonaga, Nagasaki-ken (JP); Hiroyuki Tsutaya, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/283,462

(22) Filed: Apr. 1, 1999

(30) Foreign Application Priority Data

Apr. 1, 1998 (JP) ............................................. 10-088498

(51) Int. Cl.[7] ............................. A61L 2/00; A61L 9/00; B01D 53/02
(52) U.S. Cl. ............................ 422/4; 422/24; 422/30; 95/138
(58) Field of Search ........................... 422/4, 24, 30; 95/138

(56) References Cited

U.S. PATENT DOCUMENTS

| | | | |
|---|---|---|---|
| 4,780,277 A | * 10/1988 | Tanka et al. | 422/4 |
| 5,248,395 A | 9/1993 | Rastelli et al. | 203/41 |
| 5,348,687 A | * 9/1994 | Beck et al. | 252/582 |
| 5,364,797 A | * 11/1994 | Olson et al. | 422/55 |
| 5,425,934 A | * 6/1995 | Malla et al. | 423/714 |
| 5,505,856 A | 4/1996 | Campen et al. | 210/668 |
| 5,712,402 A | 1/1998 | Pinnavaia et al. | 552/309 |

FOREIGN PATENT DOCUMENTS

| | | |
|---|---|---|
| EP | 0532803 A1 | 3/1993 |
| EP | 585572 A1 * | 7/1993 |
| EP | 0585572 A1 | 3/1994 |
| EP | 0726428 A2 | 8/1996 |

OTHER PUBLICATIONS

Apr. 2,, 2001 Korean–language Official action (and English–language translation thereof) in counterpart Korean patent applicaiton. (A copy of the Korean office Action and the English Equivalent).

Jan. 25, 2001 Canadian official action in counterpart Canadian patent application. (App# 2,265,083).

* cited by examiner

Primary Examiner—Robert J. Warden, Sr.
Assistant Examiner—Monzer R. Chorbaji
(74) Attorney, Agent, or Firm—John P. White; Cooper & Dunham LLP

(57) ABSTRACT

Ozone generated from an ozonizer is added to a polluted gas containing harmful substances, which is generated from a polluted gas source. Then, the ozone-added polluted gas is allowed to flow through an adsorbing layer containing a high-silica adsorbent that adsorbs both ozone and harmful substances. The harmful substances contained in the polluted gas are converted into harmless substances within the adsorbing layer by the action of the ozone.

10 Claims, 2 Drawing Sheets

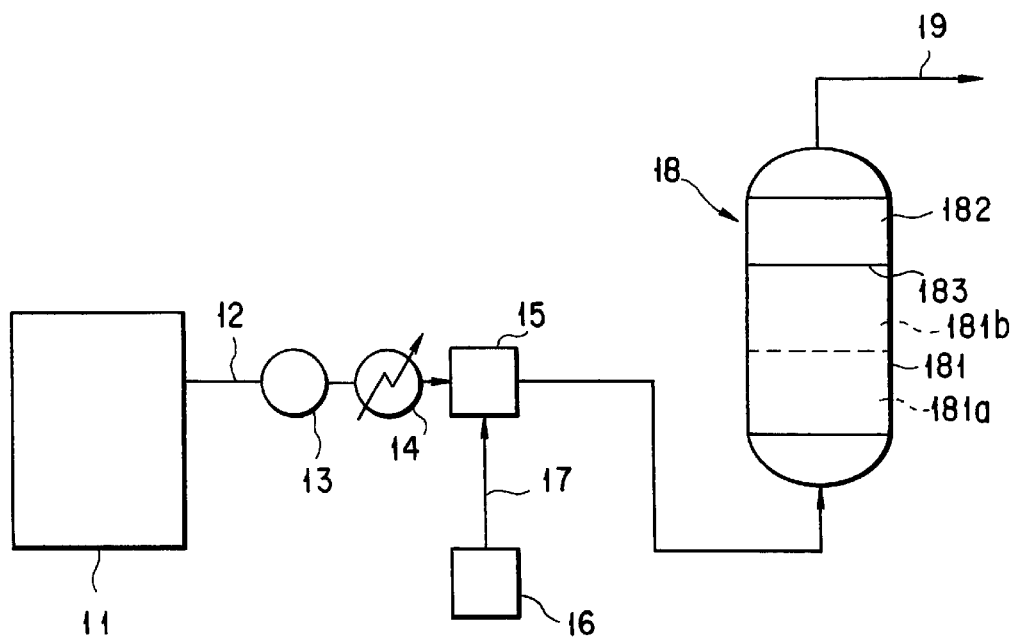
F I G. 1
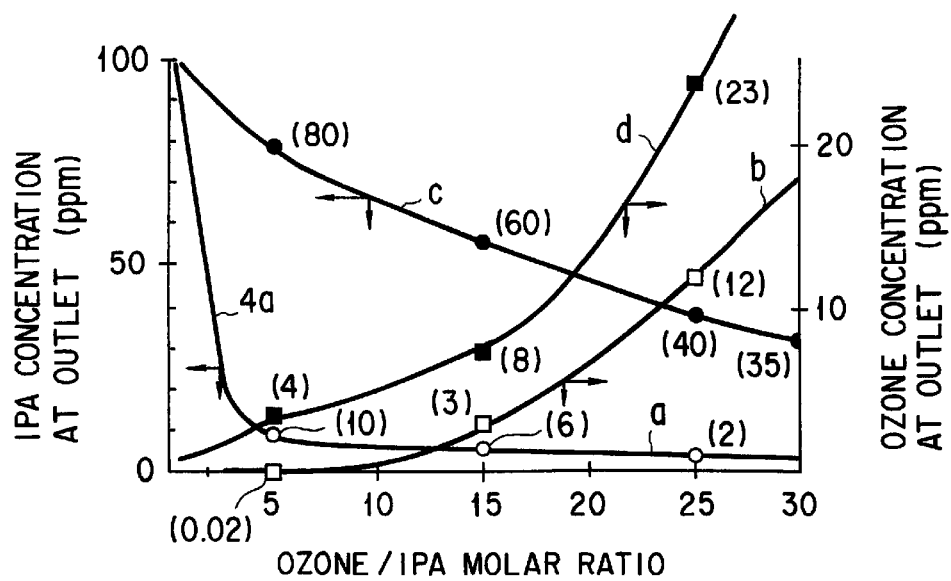
F I G. 2

METHOD AND APPARATUS FOR PROCESSING POLLUTED GAS CONTAINING HARMFUL SUBSTANCES

BACKGROUND OF THE INVENTION

The present invention relates to a method and apparatus for processing a polluted gas containing harmful substances such as various organic pollutants, malodorous components and bacteria to make the polluted gas harmless, and more particularly to a method and apparatus for processing a polluted gas containing harmful substances with ozone to make the polluted gas harmless at a high efficiency.

An oxidizing treatment with ozone is known in the art as a method of processing a polluted gas containing, for example, various organic pollutants, malodorous components, and/or bacteria, to make the polluted gas harmless. Ozone, which is self-decomposable and, thus, is unlikely to remain in the processed gas so as to give detrimental effects to the human body, is expected to be used widely in future as a clean processing agent.

For performing treatment with ozone, an ozone-containing gas from an ozone generating device (ozonizer) is injected into a polluted gas containing harmful substances. However, the concentration of the harmful substances in the polluted gas is very low in general, with the result that a large proportion of ozone is decomposed before its contribution to the decomposition by oxidation of the harmful substances and to the sterilization. It follows that ozone fails to make the polluted gas harmless at a high efficiency.

BRIEF SUMMARY OF THE INVENTION

It is therefore an object of the present invention to provide a method and apparatus for efficiently processing a polluted gas containing harmful substances such as various organic pollutants, malodorous components and/or bacteria, using ozone which is an oxidizing agent having a high safety.

The above object and other objects which will be become apparent from the following description are achieved according to the present invention by a method of processing a polluted gas containing harmful substances, comprising the steps of mixing ozone with a polluted gas containing harmful substances, and allowing the ozone-mixed polluted gas to flow through an adsorbing layer containing a high-silica adsorbent which adsorbs not only ozone, but also the harmful substances, thereby making the harmful substances harmless within the adsorbing layer by the action of the ozone.

The present invention also provides an apparatus for processing a polluted gas containing harmful substances, comprising an adsorber having an adsorbing layer arranged therein, the adsorbing layer containing a high-silica adsorbent which adsorbs not only ozone, but also harmful substances; a polluted gas supply conduit for supplying a polluted gas containing harmful substances into the adsorber; an ozonizer; an ozone supply conduit connected to the polluted gas supply conduit, for supplying ozone from the ozonizer into the polluted gas flowing within the polluted gas supply conduit; and a discharge conduit for discharging the gas having passed through the adsorbing layer within the adsorber out of the adsorber.

In a preferred embodiment of the present invention, the high-silica adsorbent is selected from the group consisting of high-silica pentacile zeolite, dealumination faujasite, mesoporous silicate and a mixture thereof.

In another preferred embodiment of the present invention, the adsorbent layer includes a first adsorbent layer positioned on the upstream side and containing a mesoporous silicate, and a second adsorbent layer positioned on the downstream side and containing a dealumination faujasite.

In still another embodiment of the present invention, a layer of an ozone decomposing agent can be provided on the downstream side of the adsorbing layer. In this case, the gas passed through the adsorbing layer is brought into contact with the ozone decomposing agent to decompose the ozone which may be present in the gas passed through the adsorbing layer, so as not to leak the ozone into the downstream gas flow.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating an apparatus according to an embodiment of the present invention for processing a polluted gas containing harmful substances;

FIG. 2 is a graph showing the relationship among the molar ratio of ozone to isopropyl alcohol (IPA), an IPA concentration at the outlet, and an ozone concentration at the outlet in Example 1 of the present invention which will be described later;

DETAILED DESCRIPTION OF THE INVENTION

Figure 3:
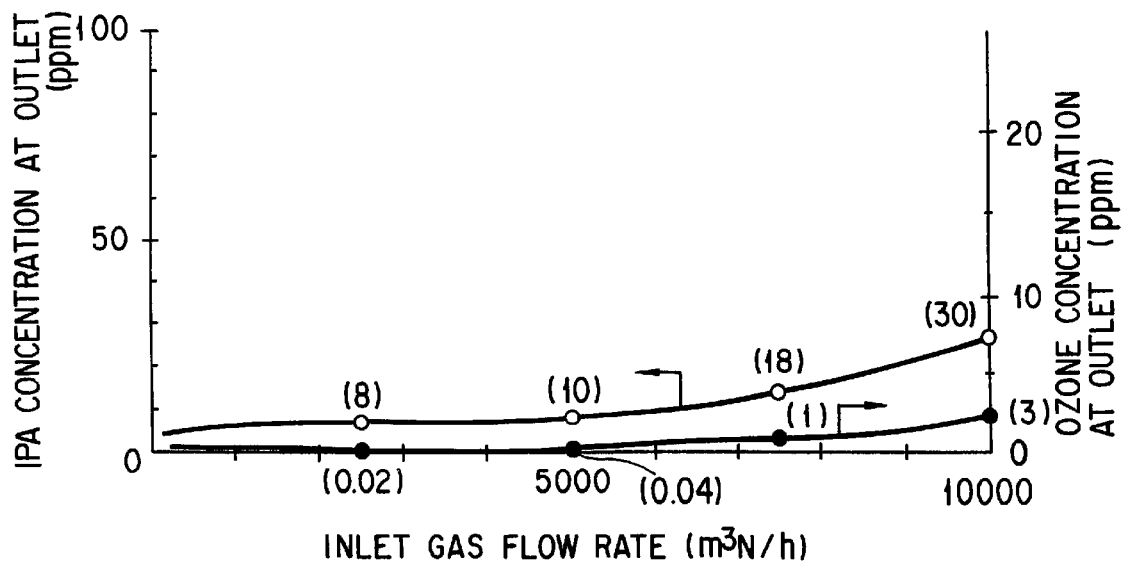
FIG. 3 is a graph showing the relationship among the inlet gas flow rate, an IPA concentration at the outlet, and an ozone concentration at the outlet in Example 2 of the present invention which will be described later.

During research on the measure for making a polluted gas containing harmful substances harmless by using ozone, the present inventors have found that ozone and harmful substances in a gaseous phase are selectively adsorbed on a high-silica adsorbent to make the concentrations of ozone and the harmful substances higher on the high-silica adsorbent than in the gaseous phase, with the result that the ozone efficiently converts the harmful substances into harmless substances. Thus, in the present invention, a polluted gas containing harmful substances is mixed first with ozone, followed by passing the resultant mixture through an adsorbing layer containing a high-silica adsorbent.

The present invention can make harmless a polluted gas containing various harmful substances including organic pollutants such as VOC (volatile organic compound: isopropyl alcohol (IPA), ethyl acetate, BTXs (benzenes, toluenes, xylenes) and halogenated organic compounds)

designated as harmful substances by the Environment Agency of Japan and dioxin; malodorous components such as mercaptan and hydrogen sulfide, and/or bacteria. The expression "to make a polluted gas harmless" should be construed to include decomposition of organic harmful substances and malodorous components by the oxidizing reaction with ozone, as well as sterilization of bacteria with ozone.

According to the present invention, ozone is added first to a polluted gas.

Ozone can be generated by various ozone generating devices (ozonizers) known per se. An ozonizer of any of a silent discharge system, an ultraviolet light lamp system, and a water electrolyzing system can be used in the present invention for generating ozone. In the water electrolyzing system, an ion exchange membrane subjected to a special treatment is interposed between a gas permeable electrode (hydrogen electrode) consisting of carbon and fluororesin and a lead dioxide electrode (ozone electrode), as is known in the art. An ion exchanged water supplied as a raw material water to the ozone electrode is electrolyzed so as to generate ozone and oxygen on the ozone electrode and hydrogen on the hydrogen electrode. Since a clean ozone gas can be obtained at a high concentration, the ozonizer of the water hydrolyzing system is particularly suitable for use in processing the polluted gas according to the present invention.

The amount of ozone can be set depending on the kinds, concentrations, etc. of the harmful components contained in the polluted gas, but is generally 1 to 20 moles, preferably about 3 to 10 moles, per mole of the harmful substance, in the ordinary processing of the polluted gas. The concentrations of the harmful substances in the polluted gas can be measured easily by a method known per se, such gas chromatography.

According to the present invention, the polluted gas mixed with ozone is then passed through an adsorbing layer containing a high-silica adsorbent of the present invention.

The adsorbent used in the present invention is a high-silica adsorbent which has a high silica content and must adsorb not only ozone, but also the harmful substance. The high-silica adsorbent used in the present invention includes, for example, silica gels, high-silica pentacile zeolites (e.g., silicalite or ZSM-5 (commercially available from Mobil Oil Corp.) having a high $SiO_2/Al_2O_3$ ratio), dealumination faujasites (e.g., ultra stable Y-type zeolites (USYs)), and mesoporous silicates (e.g., MCM-41 (commercially available from Mobil Oil Corp.), FSM-16 (commercially available from Toyota Chuo Kenkyusho, Japan), low temperature acidically synthesized mesoporous silicates prepared by using tetraethoxy silane as a silica source, which are hereinafter referred to as "low temperature mesoporous silicates I", or low temperature acidically synthesized mesoporous silicate prepared by using a low molecular weight silicic acid as a silica source, which are hereinafter referred to as "low temperature mesoporous silicate II"). Any of these high-silica adsorbents is commercially available.

Among these high-silica adsorbents, silica gels are somewhat low in their adsorption capability of ozone and harmful substances, particularly, low in their adsorption capability of harmful substances in the presence of water. Silica gels are also low in resistance to water. On the other hand, any of the high-silica pentacile zeolites, dealumination faujasites and mesoporous silicates exhibits a high adsorption capability of ozone and suppresses decomposition of the adsorbed ozone. In addition, any of these high-silica adsorbents significantly adsorbs harmful substances, exhibits resistance to water, and can be used for the processing of a humid gas.

The high-silica pentacile zeolites have a $SiO_2/Al_2O_3$ ratio of about 10 to 100, and can be obtained by a hydrothermal synthesis at about 150 to 180° C., using sodium silicate or fumed silica as a silica source, aluminum sulfate as an aluminum source, and tetrapropylammonium bromide as an organic template.

The dealumination faujasites are ultra stable Y-type zeolites (USY) having a $SiO_2/Al_2O_3$ ratio of about 10 to 400, and can be obtained by treating a Na-Y type zeolite having a $SiO_2/Al_2O_3$ ratio of about 5 with ammonia water to remove a major portion of Al included in the zeolite skeleton.

The mesoporous silicates are silica-based porous body having meso holes of 10 to 1,000 angstroms, and can be prepared by various methods. By controlling the manufacturing conditions, a $SiO_2/Al_2O_3$ ratio of the mesoporous silicates can be varied over a wide range, e.g., from those having a $SiO_2/Al_2O_3$ ratio of about 10 to those substantially consisting of $SiO_2$ alone. For example, MCM-41 is a silica-based porous body having a specific surface area of about 1600 $m^2/g$ and a $SiO_2/Al_2O_3$ ratio of about 1000, and can be obtained by a method developed by Mobil Oil Corp. (see U.S. Pat. Nos. 5,378,440; 5,364,797; and 5,348,687, as well as C. T. Kresge, M. E. Leonowiez, W. J. Roth, J. C. Vartuli and J. S. Beck, Nature, 359, 710 (1992)). Specifically, the reaction may be carried out at 140° C. under a pH of 13.5 among water glass or sodium silicate used as a silica source, aluminum sulfate as an aluminum source and a cationic surfactant (having at least 8 carbon atoms) used as an organic template so as to obtain MCM-41. FMS-16 is a silica-based porous body having a chemical structure similar to that of MCM-41 and having a $SiO_2/Al_2O_3$ ratio of about 1000. The material can be prepared by intercallation between kanemite developed by Kuroda, Inagaki, et al. (see JP 8067578, and S. Inagaki, Y. Fukushima and K. Kuroda, J. Chem. Soc., Chem. Commun., 680 (1993)) and a cationic surfactant. The low temperature mesoporous silicates I can be synthesized by a method proposed by Stucky et al. (see Q. Huo, D. I. Margolese, U. Ciesla, D. G. Demuth, P. Peng, T. E. Gier, P. Siger, A. Firouzi, B. F. Chmelka, F. Schuth and G. D. Stucky, Chem. Mater., 6, 1176 (1994). Specifically, the material can be obtained by the reaction at room temperature and a pH of 1 or less among tetraethoxy silane (TEOS) used as a silica source, aluminum sulfate as an aluminum source and a cationic surfactant used as an organic template. Further, the low temperature mesoporous silicates II can be prepared by a method described in Y. M. Setoguchi, Y. Teraoka, I. Moriguchi, S. Kagawa, N. Tomonaga, A. Yasutake, and J. Izumi, Jounal of Porous Materials, 4, 129–134 (1997). Specifically the material can be prepared by the reaction at room temperature and a pH of 1 or less among silicic acid, which does not contain a polycondensed silica and is used as a silica source, aluminum sulfate used as an aluminum source and a cationic surfactant used as an organic template. By controlling the reaction conditions, a $SiO_2/Al_2O_3$ ratio of the mesoporous silicate can be varied over a wide range, from those having a $SiO_2/Al_2O_3$ ratio of about 10 to those substantially consisting of $SiO_2$ alone.

The present inventors have experimentally found that, among the high-silica adsorbents, high-silica pentacile zeolites having a $SiO_2/Al_2O_3$ ratio of 70 or more, dealumination faujasites having a $SiO_2/Al_2O_3$ ratio of 20 or more and mesoporous silicates having a $SiO_2/Al_2O_3$ ratio of 20 or more exhibit a high ozone adsorbing capability, suppress decomposition of the adsorbed ozone and, thus, can be used as preferred adsorbents. Among these preferred adsorbents, the high-silica pentacile zeolites, which certainly exhibit a high ozone adsorbing capability, tend to be somewhat high in the ozone decomposition rate. In view of both the ozone adsorption capability and the ozone decomposition rate, mesoporous silicates having a $SiO_2/Al_2O_3$ ratio of 20 or more provide the most satisfactory adsorbent. Then, dealumination faujasites having a $SiO_2/Al_2O_3$ ratio of 20 or more and high-silica pentacile zeolites having a $SiO_2/Al_2O_3$ ratio of 70 or more follow the mesoporous silicates in the order mentioned.

These adsorbents can be used singly or in the form of a mixture and can be formed into an optional shape, i.e., can be shaped like grains, pellets, Raschig rings, honeycombs, etc., depending on the purpose of the use. The adsorbing layer may be of a double layer structure comprising a first adsorbent layer arranged on the upstream side and containing a mesoporous silicate which is capable efficiently adsorbing a high concentration ozone, and a second adsorbent layer arranged on the downstream side and containing a dealumination faujasite which is capable of efficiently adsorbing a low concentration ozone. The adsorbing layer of the particular double layer structure permits improving the efficiency of utilizing ozone.

In the present invention, the temperature of the polluted gas passing through the adsorbing layer is not particularly limited, but should preferably be 0° C. to 100° C., and more preferably 15° C. to 50° C.

As described above, ozone is mixed in the present invention with a polluted gas containing harmful substances, followed by allowing the ozone-mixed polluted gas to flow through the adsorbing layer containing a high-silica adsorbent. As a result, an oxidizing reaction is carried out between the harmful substances and ozone within the adsorbing layer so as to decompose the harmful substances. The particular technique of the present invention permits converting the harmful substances into harmless substances at an efficiency markedly higher than that in the conventional technique of simply adding ozone to a polluted gas containing harmful substances.

As a result of an extensive research on the adsorption of ozone in a gaseous phase, the present inventors have found that a high-silica adsorbent, particularly, a high-silica pentacile zeolite, a dealumination faujasite and mesoporous silicate, efficiently adsorbs ozone and, at the same time, harmful substances such as organic pollutants, bacteria and malodorous components. It has also been found that the adsorbed ozone efficiently oxidizes the adsorbed organic pollutants and malodorous components and, at the same time, kills the bacteria, and that ozone is converted into oxygen, arriving at the present invention.

While the present invention should not be bound by theory, it is believed that the ozone concentration [$O_3$] and the organic pollutant concentration [ORG] in the high-silica adsorbent layer are considered to be about 10 to 100 times as high as those in a gaseous phase, respectively. On the other hand, the reaction rate of ozone with a polluted gas for oxidizing the pollutants into harmless substances is proportional to the product [$O_3$].[ORG] of the ozone concentration [$O_3$] and the organic pollutant concentration [ORG]. It follows that the reaction rate on the high-silica absorbent is rendered about 100 to about 10,000 times as high as that in a gaseous phase. Thus, the harmful substances within a polluted gas can be rendered harmless highly efficiently by bringing an ozone-added polluted gas into contact with a high-silica adsorbent according to the present invention.

It should also be noted that ozone in a gaseous phase also collides against a third substance other than harmful substances. The ozone molecules colliding against the third substance are decomposed, resulting in failure to contribute to the reaction for making the harmful substances harmless. It follows that ozone in a gaseous phase fails to convert harmful substances efficiently into harmless substances. In the present invention, however, ozone and harmful substances are selectively adsorbed on the high-silica adsorbent so as to markedly lower the probability of collision of ozone molecules against the third substance. Naturally, ozone is effectively consumed for the conversion of harmful substances into harmless substances.

In the ordinary processing of a polluted gas in the present invention, the unreacted ozone remains in the high-silica adsorbent and, thus, is substantially free from leakage into the downstream flow. However, where a large amount of ozone is added, as in the case of killing special bacteria, or for some reason, the unreacted ozone may possibly leak into the downstream flow. In such a case, it is possible to bring the leaking ozone into contact with an ozone decomposing agent such as a consumption type adsorbent (e.g., activated carbon) capable of oxidizing the ozone into carbon dioxide, or an alumina-based compound, so as to completely decompose the leaking ozone. Needless to say, a layer of the ozone decomposing agent is arranged downstream of the adsorbing layer specified in the present invention. It was customary to use activated carbon for processing a leaking ozone. However, as pointed out above, the reaction rate is low in the processing of harmful substances into harmless substances within a gaseous phase as in the prior art. The low reaction rate leads to a high concentration of the leaking ozone, with the result that the activated carbon is consumed by ozone in a considerably large amount and, thus, the activated carbon must be renewed frequently. Naturally, it was of high importance to improve the situation. The present invention is markedly advantageous in this respect. Specifically, since the leaking ozone concentration in the present invention is less than about 1/10 the value in the prior art, the frequency of renewing the activated carbon in the present invention is less than about 1/10 the level in the prior art. In other words, the life of the activated carbon is markedly improved in the present invention, i.e., more than about 10 times as long as in the prior art.

In the present invention, a filtering layer for removing dust may be arranged, if necessary, on the upstream side of the point at which ozone is injected into the polluted gas containing harmful substances or on the downstream side of the adsorbing layer containing a high-silica adsorbent. Whether to use or where to arrange the filtering layer may be determined appropriately depending on the situation of the apparatus, the properties of the harmful substances, etc.

FIG. 1 is a block diagram illustrating an apparatus 10 of the present invention for processing a polluted gas containing harmful substances. As shown in FIG. 1, the apparatus 10 comprises an adsorber or adsorbing device 18 having an adsorbing layer 181 arranged therein. The adsorbing layer 181 contains a high-silica adsorbent of the present invention. In a preferred embodiment, the adsorbing layer includes a first adsorbing layer 181a positioned on the upstream side and containing a mesoporous silicate and a second adsorbing layer 181b positioned on the downstream side and containing a dealumination faujasite, as shown by the broken line.

A polluted gas supply conduit 12 is connected to the adsorber 18, for supplying a polluted gas containing harmful substances and generated from a polluted gas source 11. In this embodiment, the conduit 12 is connected to a bottom portion of the adsorber 18.

A blower 13 is mounted to the conduit 12 and is used for blowing the polluted gas coming from the polluted gas source 11 into the adsorber 18. A heater or cooler 14 may mounted to the conduit 12, downstream of the blower 13 and may be used for controlling the temperature of the polluted gas passing through the conduit 12 (or an adsorbing temperature), if desired. A mixer 15 such as a pre-mixing chamber is mounted to the conduit 12, downstream of the cooler or heater 14. Further, an ozone supply conduit 17 for supplying an ozone-containing gas generated from an ozonizer 16 is connected to the mixer 15. The polluted gas and the ozone-containing gas are sufficiently mixed in the mixer 15, and the mixed gas is supplied into the adsorber 18. The flow rate of the polluted gas can be controlled by the blower 13.

Further, a discharge conduit 19 for discharging the processed gas that has passed through the adsorbing layer 181 to the outside of the adsorber 18 is connected to an upper portion of the adsorber 18.

The harmful substances and ozone contained in the mixed gas supplied into the bottom portion of the adsorber 18 through the conduit 12 are co-adsorbed on the high-silica adsorbent contained in the adsorbing layer 181. As a result, reaction is carried out between the adsorbed harmful substances and the adsorbed ozone both of which are present on the adsorbent at high concentrations, so as to decompose efficiently the harmful substances. In general, unreacted ozone does not leak into the processed gas discharged to the outside through the discharge conduit 19. However, it is possible to arrange, as desired, a layer 182 of the ozone decomposing agent downstream of the adsorbing layer 181. In the embodiment shown in FIG. 1, a perforated partition plate 183, e.g., punched metal plate, is interposed between the adsorbing layer 181 and the layer 182 of the ozone decomposing agent arranged downstream of the adsorbing layer 181 (or above the adsorbing layer 181 in the drawing).

The method and apparatus of the present invention make it possible to convert harmful substances efficiently into harmless substances. In addition, the unreacted ozone does not leak into the processed gas. What should also be noted is that a polluted gas cleaning system of a high performance, in which the harmful substance decomposing function and sterilizing function inherent in ozone are fully utilized, can be realized by the present invention with relatively simple facilities. It follows that the present invention can be applied in various fields including, for example, cleaning, deodorizing and/or sterilization of the air within general office buildings, hospitals, hotels, food plants, subway premises, play rooms and trains; cleaning of waste gases containing traces of organic substances, which are discharged from printing factories, injection molding factories, clean rooms, and paint factories; treatment of waste gases generated from dust burning furnaces; deodorizing of waste gases generated from fermenting factories and garbage disposal units; and removal of malodors from raw sewage and sewerage treating process.

The present invention will now be described more in detail with reference to Examples.

EXAMPLE 1

The air containing 100 ppm of isopropyl alcohol (IPA) as a harmful substance, which was used as a pseudo waste gas of a printing factory, was processed by a processing apparatus of the construction shown in FIG. 1, except that the layer 182 of an ozone decomposing agent and a partition plate 183 were not included in the apparatus, under the conditions shown in Table 2. Each of high-silica adsorbents A to D shown in Table 1 was loaded in the adsorbing layer 181.

TABLE 1

Adsorbent Used

| Symbol | Kind | $SiO_2/Al_2O_3$ Ratio | Shape |
|---|---|---|---|
| A | Mesoporous Silicate | ∞ | Honeycomb |
| B | Dealumination Faujasite | 70 | Honeycomb |
| C | High-Silica Pentacile Zeolite | 400 | Honeycomb |
| D | Silica Gel | ∞ | Honeycomb |

TABLE 2

Test Conditions

| Adsorbent | Amount Used: 2 $m^3$ |
|---|---|
| Polluted Gas: Pseudo waste gas of printing factory | IPA Content: 100 ppm<br>Flow Rate: $10^4$ $m^3$ N/h<br>Superficial Velocity: 2 m/s |
| Processing Temperature | 25° C. |
| Ozone Amount | Ozone/IPA Molar Ratio of 0–30 |

The air containing 100 ppm of IPA was processed under the conditions shown in Table 2, and the IPA concentration and the ozone concentration in the gas sampled in the discharge conduit 19 of the adsorber 18 were measured, with the results as shown in FIG. 2. The experimental data were found to be substantially the same in the cases of using the adsorbents A, B and C. Therefore, these cases are handles as a single case in the graph of FIG. 2. Specifically, curves a and b relate to the adsorbent A, B and C, while curves c and d relate to the adsorbent D. The values put in the parentheses represent the concentrations (ppm) plotted on the ordinates (two ordinates). Table 3 shows the IPA concentrations and ozone concentrations at the outlet portion at ozone/IPA molar ratios of 5, 15 and 25.

As apparent from FIG. 2, an ozone/IPA molar ratio of about 20 was required for removing at least 50% of IPA, and the leaking ozone was found to be about 10 ppm, in the case of using the adsorbent D. In the cases of using the adsorbents A to C, however, at least 50% of IPA was removed at an ozone/IPA molar ratio of only 2. Where the ozone/IPA molar ratio was 3, at least 80% of IPA was removed. Also, the leaking ozone was found to be 1 ppm or less at an ozone/IPA molar ratio of 10 or less. Further, the leaking ozone was 3 ppm at an ozone/IPA molar ratio of 15.

TABLE 3

Extract of Test Results
(Concentration in Outlet Gas in ppm)

| | Ozone/IPA: 5 | | Ozone/IPA: 15 | | Ozone/IPA: 25 | |
|---|---|---|---|---|---|---|
| Adsorbent | IPA | Ozone | IPA | Ozone | IPA | Ozone |
| A–C | 10 | 0.02 | 6 | 3 | 2 | 12 |
| D | 80 | 4 | 60 | 8 | 40 | 23 |

EXAMPLE 2

The IPA concentration and the ozone concentration in the processed gas were measured as in Example 1. In this experiment, the air containing 100 ppm of IPA was processed by using the adsorbent A in an amount of 1 m³. The ozone/IPA molar ratio was set at 5 and the adsorbing temperature was set at 25° C. Further, the flow rate of the IPA-containing air into the adsorber 18 was changed by controlling the blower 13. FIG. 3 shows the results. As apparent from FIG. 3, at least 90% of IPA was removed at a flow rate of 6000 m³ N/h, and at least 80% of IPA was removed even where the flow rate was increased to 8000 m³ N/h. In addition, the ozone leaking amount was found to be 1 ppm or less. Table 4 shows the IPA concentration and the leaking ozone concentration in the processed gas under the gas flow rates into the adsorber 18 of 2500 m³ N/h, 5000 m³ N/h, 7500 m³ N/h, and 10,000 m³ N/h, which were taken from FIG. 3.

TABLE 4

Extract of Test Results
(Concentration in Outlet Gas in ppm)

| Measured Item | 2500 m³ N/h | 5000 m³ N/h | 7500 m³ N/h | 10000 m³ N/h |
| --- | --- | --- | --- | --- |
| IPA | 8 | 10 | 18 | 30 |
| Ozone | 0.02 | 0.04 | 1 | 3 |

EXAMPLE 3

Figure 4:
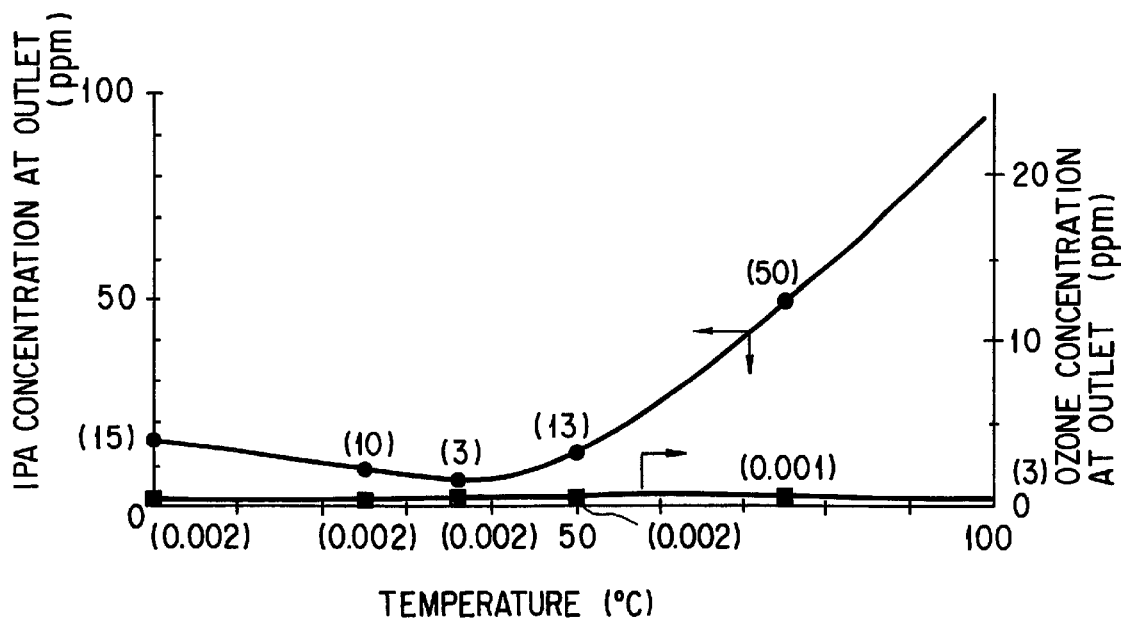
FIG. 4 is a graph showing the relationship among the processing temperature, an IPA concentration at the outlet, and an ozone concentration at the outlet in Example 3 of the present invention which will be described later.

The IPA concentration and the ozone concentration in the processed gas were measured as in Example 1. In this experiment, the air containing 100 ppm of IPA was processed by using the adsorbent A in an amount of 2 m³. The ozone/IPA molar ratio was set at 5 and the IPA-containing air was supplied into the adsorber 18 at a rate of $10^4$ m³ N/h. Also, the adsorbing temperature (or the gas temperature) was set at various levels. FIG. 4 shows the results. As apparent from FIG. 4, the ozone leaking amount was found to be 0.002 ppm or less under these conditions. Also, at least 80% of IPA was removed under the adsorbing temperature of 60° C. or lower, and at least 90% of IPA was removed even where the adsorbing temperature was lowered to fall within a range of between 20° C. and 50° C. Table 5 shows the IPA concentration and the leaking ozone concentration in the processed gas under the adsorbing temperature of 0° C., 25° C., 35° C., 50° C. and 75° C., which were taken from FIG. 4.

TABLE 5

Extract of Test Results
(Concentration in Outlet Gas in ppm)

| Measured Item | 0° C. | 25° C. | 35° C. | 50° C. | 75° C. |
| --- | --- | --- | --- | --- | --- |
| IPA | 15 | 10 | 3 | 13 | 50 |
| Ozone | 0.002 | 0.002 | 0.002 | 0.002 | 0.001 |

EXAMPLE 4

The air containing a predetermined amount of ethyl acetate, methyl mercaptan, or dioxin as a harmful substance was processed by a processing apparatus of the construction shown in FIG. 1, except that the layer 182 of an ozone decomposing agent and a partition plate 183 were not included in the apparatus. Each of the high-silica adsorbents shown in Table 1 was loaded in the adsorbing layer 181 in an amount of 1 m³. In this experiment, the flow rate of the air containing the harmful substance was set at 5,000 m³ N/h, and the processing temperature was set at 2.5° C. Table 6 shows the results.

As apparent from Table 6, the method of the present invention is effective for removing various kinds of organic substances. Particularly, adsorbents A to C exhibited a high removal rate of the harmful substance and was low in the leaking ozone. Among these adsorbents, adsorbent A was found to exhibit particularly prominent effect of the present invention.

TABLE 6

Processing Results

| Adsorbent | Harmful Substance | Ozone Conc. (ppm) | | Harmful Substance Conc. (ppm) | |
| --- | --- | --- | --- | --- | --- |
| | | Inlet | Outlet | Inlet | Outlet |
| A | Ethyl | 50 | 0.05 | 10 | 0.5 |
| B | Acetate | 50 | 0.1 | 10 | 0.8 |
| C | | 50 | 0.1 | 10 | 0.8 |
| D | | 50 | 30 | 10 | 8 |
| A | Methyl | 2 | 0.01 | 0.5 | 0.01 |
| B | Mercaptan | 2 | 0.03 | 0.5 | 0.02 |
| C | | 2 | 0.003 | 0.5 | 0.02 |
| D | | 2 | 1.5 | 0.5 | 0.3 |
| A | Dioxin | 1 | 0.01 | 100 | <0.01 |
| B | | 1 | 0.03 | 100 | <0.01 |
| C | | 1 | 0.03 | 100 | <0.01 |
| D | | 1 | 0.5 | 100 | 80 |

Note 1: The dioxin concentration given in the column of harmful substance concentration is in ng/m³.
Note 2: The expression "<0.01" in the column of dioxin concentration indicates that dioxin was not detected.

As described above, the present invention is directed to the processing of a polluted gas containing harmful substances with ozone. In the present invention, a high-silica adsorbent is used that efficiently adsorbs ozone and also adsorbs harmful substances, making it possible to utilize efficiently ozone for decomposing the harmful substances and for killing bacteria. In other words, ozone is allowed to efficiently convert harmful substances into harmless substances. What should also be noted is that the adsorbent used in the present invention exhibits a high ozone adsorbing power so as to suppress the leaking of ozone into the processed gas. In addition, the ozone leakage can be completely prevented by arranging a layer of an ozone decomposing agent such as an activated carbon layer downstream of the adsorbing layer, if necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A method of processing a polluted gas containing harmful substances, comprising the steps of:
   mixing ozone with a polluted gas containing harmful substances; and
   allowing the ozone-mixed polluted gas to flow through an adsorbing layer containing a high-silica adsorbent, which substantially does not decompose ozone, selected from the group consisting of pentacile zeolite having a $SiO_2/Al_2O_3$ ratio of about 10 to 100, dealumination faujasite having a $SiO_2/Al_2O_3$ ratio of about

10 to 400 and mesoporous silicate having a $SiO_2/Al_2O_3$ ratio of about 10 to 1000, selectively adsorbing both ozone and harmful substances on said high-silica adsorbent and oxidizing said harmful substances with said ozone on said high-silica adsorbent so as to make the harmful substances harmless within the adsorbing layer.

2. The method according to claim 1, wherein said high-silica adsorbent is selected from the group consisting of a high-silica pentacile zeolite, a dealumination faujasite, and a mesoporous silicate.

3. The method according to claim 1, wherein said adsorbing layer comprises a first adsorbing layer positioned on the upstream side and containing a mesoporous silicate and a second adsorbing layer positioned on the downstream side and containing a dealumination faujasite.

4. The method according to claim 1, wherein the gas passing through said adsorbing layer is brought into contact with an ozone decomposing agent so as to decompose the remaining ozone.

5. An apparatus for processing a polluted gas containing harmful substances, comprising:

an adsorber having an adsorbing layer arranged therein, said adsorbing layer containing a high-silica adsorbent, which substantially does not decompose ozone, selected from the group consisting of pentacile zeolite having a $SiO_2/Al_2O_3$ ratio of about 10 to 100, dealumination faujasite having a $SiO_2/Al_2O_3$ ratio of about 10 to 400 and mesoporous silicate having a $SiO_2/Al_2O_3$ ratio of about 10 to 1000, said high-silica adsorbent selectively adsorbing both ozone and harmful substances thereon;

a polluted gas supply conduit for supplying a polluted gas containing harmful substances into said adsorber;

an ozonizer;

an ozone supply conduit connected to said polluted gas supply conduit for supplying ozone generated from said ozonizer into the polluted gas flowing within said polluted gas supply conduit; and a discharge conduit for discharging the gas flowing through the adsorbing layer arranged within the adsorber out of the adsorber.

6. The apparatus according to claim 5, wherein said high-silica adsorbent is selected from the group consisting of a high-silica pentacile zeolite, a dealumination faujasite, and a mesoporous silicate.

7. The apparatus according to claim 5, wherein said adsorbing layer comprises a first adsorbing layer positioned on the upstream side and containing a mesoporous silicate and a second adsorbing layer positioned on the downstream side and containing a dealumination faujasite.

8. The apparatus according to claim 5, wherein the gas passing through said adsorbing layer is brought into contact with an ozone decomposing agent so as to decompose the remaining ozone.

9. A method of processing a polluted gas containing harmful substances, consisting the steps of:

mixing ozone with a polluted gas containing harmful substances;

allowing the ozone-mixed polluted gas to flow through an adsorbing layer consisting of a high-silica adsorbent, which substantially does not decompose ozone, selected from the group consisting of pentacile zeolite having a $SiO_2/Al_2O_3$ ratio of about 10 to 100, dealumination faujasite having a $SiO_2/Al_2O_3$ ratio of about 10 to 400 and mesoporous silicate having a $SiO_2/Al_2O_3$ ratio of about 10 to 1,000; and selectively adsorbing both ozone and harmful substance on said high-silica adsorbent and oxidizing said harmful substances with said ozone on said high-silica adsorbent so as to make the harmful substances harmless within the adsorbing layer.

10. An apparatus for processing a polluted gas containing harmful substances, consisting essentially of:

an adsorber having an adsorbing layer arranged therein, said adsorbing layer consisting of a high-silica adsorbent which substantially does not decompose ozone selected from the group consisting of pentacile zeolite having a $SiO_2/Al_2O_3$ ratio of about 10 to 100, dealumination faujasite having a $SiO_2/Al_2O_3$ ratio of about 10 to 400 and mesoporous silicate having a $SiO_2/Al_2O_3$ ratio of about 10 to 1,000, said high-silica adsorbent selectively adsorbing both ozone and harmful substances thereon;

a polluted gas supply conduit for supplying a polluted gas containing harmful substances into said adsorber;

an ozonizer;

an ozone supply conduit connected to said polluted gas supply conduit for supplying ozone generated from said ozonizer into the polluted gas flowing within said polluted gas supply conduit; and a discharge conduit for discharging the gas flowing through the adsorbing layer arranged within the adsorber out of the adsorber.

* * * * *